United States Patent [19]

Spanninger

[11] 3,867,479

[45] Feb. 18, 1975

[54] THERMOPLASTIC LINEAR FIBER FORMING POLYESTER RESINS HAVING IMPROVED ANIONIC DYEABILITY

[75] Inventor: Philip A. Spanninger, Akron, Ohio

[73] Assignee: The Goodyear Tire & Rubber Company, Akron, Ohio

[22] Filed: July 2, 1973

[21] Appl. No.: 376,005

[52] U.S. Cl. ............................. 260/860, 260/75 N
[51] Int. Cl. ............................................ C08g 39/10
[58] Field of Search ..... 260/860, 75 N; 8/4, DIG. 4, 8/179

[56] References Cited
UNITED STATES PATENTS

| | | | |
|---|---|---|---|
| 2,647,104 | 7/1953 | Shivers, Jr. ........................ | 260/75 N |
| 2,739,958 | 3/1956 | Lincoln et al. ..................... | 260/75 N |
| 2,921,828 | 1/1960 | Caldwell ............................. | 8/168 |
| 3,065,207 | 11/1962 | Andres ................................ | 260/75 N |
| 3,551,521 | 12/1970 | Thomas ............................. | 260/45.9 X |

FOREIGN PATENTS OR APPLICATIONS 990,579  4/1965  Great Britain

Primary Examiner—Harold D. Anderson
Assistant Examiner—T. Pertilla
Attorney, Agent, or Firm—F. W. Brunner; J. M. Wallace, Jr.

[57] ABSTRACT

Copolymers containing hydroxyamine salts formed in situ in polyester forming reactants can be formed into fibers having improved dyeability with acid type dyes. From 1 to about 15 mol percent of the amine salt based on the total acid units present, exclusive of the amine salt, is used. The polymers can be random or block polymers.

11 Claims, No Drawings

THERMOPLASTIC LINEAR FIBER FORMING POLYESTER RESINS HAVING IMPROVED ANIONIC DYEABILITY

This invention relates to linear thermoplastic copolymer resins containing anion attractive groups, a method of making the resins, to products prepared from the resins, and especially to anionically dyeable and dyed fibers and films of the resins.

According to the prior art anion attractive groups can be incorporated into polyester molecules through a functional group. Such polymers could be formed into fibers, but generally the fibers did not have good thermal or ultraviolet stability and had poor physical properties. Surprisingly, anionic dyeability was not greatly improved. Some improvement in anionic dyeability of these polymers was obtained by incorporating additionally some groups that retained amorphous character, such as polyether groups. However, such groups further reduced the thermal stability and ultraviolet stability of the products containing them and commercially acceptable products were not obtained.

Now, in contrast to such prior art, it has been found that when the anion attractive groups incorporated in the polyester molecules have interaction between the anion attractive units and the polyester molecules, the polymeric polyester resin has improved dye receptivity for anionic dyes. Interactions between anion attractive groups are obtained by incorporation of the amine and dicarboxylic acid in the polymer chain as an amine salt formed in situ rather than simply the amine so that the polyester molecules are, in effect, opened up, allowing penetration or migration of anion containing molecules (such as anionic or acid type dyes) into the polymer with the result that the polyesters now have superior anionic dyeability as well as improved dispersed dyeability. Furthermore, the increased hydrophilicity and amorphous nature yields improved antistatic, low pilling and soil release properties.

According to the present invention anion attractive groups such as monohydroxyamine salts of organic dicarboxylic acids and dihydroxyamine salts of organic dicarboxylic acids can be incorporated in polyester resin molecules by forming such salts in situ in the polyester forming reaction mixture and incorporating these salts in the polyester molecules during reaction of said mixtures to form modified resins that can be readily dyed to deep shades with acid type dyes. Generally a sufficient amount of the amine in a one to one mol ratio of the amine to salt forming acid is used to provide from about 1 to about 15 mol percent of amine units based on the total mols of acid units in the polyester exclusive of the acid units added in conjunction with the amine itself.

Representative examples of amines that can be used to form salts in situ in the polyester reaction mixture are monoalkanolamines of the general formula

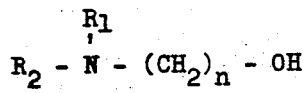

wherein $R_1$ is a radical selected from the group consisting of alkyl, cycloalkyl or aryl, $R_2$ is hydrogen or a radical selected from the group consisting of alkyl, cycloalkyl or aryl, and $n$ is an integer having a value of from 2 to 10. Representative examples of the amines are 2-cyclohexylamino-1-ethanol, 2(N-ethylanilino)-1-ethanol, N-ethyl-N-benzyl ethanolamine, 3-diethylamino-1-propanol, 3-diethylamino-2,2-dimethyl-1-propanol, 3-(2-pyridyl)-1-propanol, N-dibutyl glycolamine, 4-diethylamino-1-butanol, β-(diethylaminoethoxy) ethanol, 3-(3-pyridyl methylamino)-1-propanol, 2-[2-(p-tolyloxy)-ethylamino] ethanol, N-ethyl-ethanolamine, N-ethyl-N-cyclohexyl-1-ethanolamine, N-ethyl-N-phenyl-1-ethanolamine, N-ethyl-N-tolyl-1-ethanolamine, N,N-dicyclohexyl-1-ethanolamine, N-cyclohexyl-N-phenyl-1-ethanolamine, N-cyclohexyl, N-tolyl-1-ethanolamine, N-cyclohexyl-N-benzyl-1-ethanolamine, N,N-diphenylamino-1-ethanol, N-phenyl-N-tolyl-1-ethanolamine, N-phenyl-N-benzyl-1-ethanolamine, N-phenyl-N-2-pyridyl-1-ethanolamine, N,N-ditolyl-1-ethanolamine, N-tolyl-N-2-pyridylamino-1-ethanol, N-benzyl-1-ethanolamine, N,N-dibenzylamino-1-ethanol, N-benzyl-N-2-pyridylamino-1-ethanol and N,N-di (2-pyridyl)amino-1-ethanol.

Representative examples of dihydroxyamines used to form salts in situ are amines having the general formula selected from the group consisting of (a) 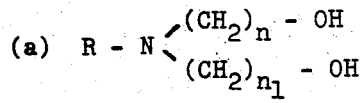

and (b) 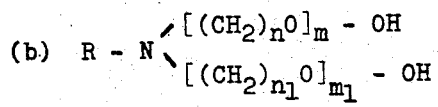

wherein R is a radical selected from the group consisting of alkyl, aryl, aralkyl, alkaryl, cycloalkyl, alkoxyalkyl, aryloxyalkyl, aralkoxy alkyl, alkoxy aryl, aryloxy aryl, alkaryloxy aryl, alkoxy aralkyl, aryloxy aralkyl, aralkoxy aralkyl and pyridyl radicals, $n$ and $n_1$ are integers from 2 to 10 and $m$ and $m_1$ are integers from 0 to 25. The R radicals can contain substituents such as alkyl ether, cycloalkyl ether and aryl ether groups, for example, ethoxy, propoxy, cyclohexoxy and phenoxy groups.

Representative examples of alkyl radicals in the above formulas are radicals such as methyl, ethyl, isopropyl, propyl, isobutyl, t-butyl, butyl, pentyl, hexyl, heptyl, octyl, stearyl; aryl radicals are phenyl, naphthyl; aralkyl radicals are benzyl, phenethyl; alkaryl radicals are tolyl, ethyl phenol; cycloalkyl radicals are cyclohexyl, cyclododecyl; alkoxy alkyl radicals are methoxy ethyl, ethoxy ethyl; aryloxy alkyl radicals are phenoxy ethyl, phenoxy butyl; aralkoxy alkyl radicals are benzyloxy methyl and benzyloxy ethyl.

Representative examples of amines of the class are N-substituted dialkanolamines such as the N-substituted diethanolamines, N-substituted dipropanolamines, N-substituted dibutanolamines and N-substituted dihexanolamines, N-substituted dipentanolamines, N-substituted dioctanolamines, N-substituted dinonanolamines and N-substituted didodecanolamines.

Representative examples of such amines are amines such as N-methyl diethanolamine, N-ethyl diethanolamine, N-propyl diethanolamine, N-butyl diethanolamine, N-hexyl diethanolamine, N-heptyl diethanolamine, N-octyl diethanolamine, N-stearyl diethanolamine, N-phenyl diethanolamine, N-naphthyl diethanolamine, N-benzyl diethanolamine, N-phenethyl diethanolamine, N-tolyl diethanolamine, N-ethylphenyl diethanolamine, N-cyclohexyl diethanolamine, N-cyclododecyl diethanolamine, N-2-methoxyethyl diethanolamine, N-2-ethoxyethyl diethanolamine, N-2-phenoxyethyl diethanolamine, N-2-phenoxybutyl diethanolamine, N-2-benzyloxymethyl diethanolamine, N-2-benzyloxyethyl diethanolamine, N-p-ethoxybenzyl diethanolamine, oxybenzyl diethanolamine and N-benzyloxyphenyl diethanolamine.

The copolymers of the invention may be considered as modified polyesters. Thus the basic structures of the copolymers are fiber forming polyesters or copolyesters such as polyalkylene terephthalate, polycycloalkylene terephthalate, polyalkylene naphthalate, polycycloalkylene naphthalate, polyalkylene terephthalate copolyesters containing at least 80 mol percent of polyalkylene terephthalate and polyalkylene naphthalate copolyesters containing at least 80 mol percent of polyalkylene naphthalate. Representative examples of such polyesters are polyethylene terephthalate, polycyclohexylene dimethylene terephthalate, polyethylene naphthalate, polycyclohexylene dimethylene naphthalate, ethylene terephthalate copolyesters containing at least 80 mol percent of ethylene terephthalate, ethylene terephthalate-ethylene aliphatic dicarboxylate copolyesters containing at least 80 mol percent of ethylene terephthalate and ethylene naphthalate-ethylene aliphatic dicarboxylate copolyesters containing at least 80 mol percent of ethylene naphthalate.

The resins can be derived from dicarboxylic acids or ester forming derivatives thereof and glycols. Representative examples of dicarboxylic acids from which the resins can be derived are aromatic dicarboxylic acids such as terephthalic acid, isophthalic acid and the naphthalic acids; aliphatic dicarboxylic acids such as adipic acid, sebacic acid and azelaic acid. The resins can be made from various glycols including ethylene glycol, the propylene glycols, tetramethylene glycol, pentamethylene glycol and 1,4 cyclohexane dimethanol. Ethylene glycol is preferred because of its low cost and ready availability.

The dicarboxylic acids that can be used in the present invention are aromatic dicarboxylic acids and aliphatic dicarboxylic acids. Representative examples of such acids are terephthalic acid, isophthalic acid, oxalic acid, malonic acid, succinic acid, glutaric acid, adipic acid, azelaic acid, pimelic acid, decandioic acid and dodecane dioic acid.

The invention is illustrated by the following examples in which parts and percentages are by weight unless otherwise indicated.

EXAMPLE 1

A mixture of 43.2 grams (0.222 mol) dimethyl terephthalate, 31.2 grams (0.505 mol) ethylene glycol was heated in the presence of 0.02 gram zinc acetate to 170° C. until the reaction began. Then the temperature of the mixture was raised to 190° C. to 200° C. and the mixture reacted until about 15 milliliters of methanol was distilled from the mixture. The molten product was poured out under an $N_2$ atmosphere. The cooled solidified product was powdered and used in subsequent polymerization reactions in Examples 2 and 3.

EXAMPLE 2

Into a polymerization vessel equipped with a mechanically driven glass rod stirrer, an $N_2$ gas stream passing into the top of the vessel and a condenser with a distillate receiver was placed 51.82 grams (0.204 mol) bis($\beta$-hydroxyethyl) terephthalate (product of Example 1), 0.21 part per thousand antimony trioxide and 2.36 grams (0.02 mol) succinic acid. The polycondensation was begun at 240° C. and the pressure gradually reduced. At 100 millimeters mercury, 3.22 grams (0.02 mol) tertiary butyl diethanolamine and 6.25 grams (6.25 millimols) poly (tetramethylene oxide) ($\overline{M}_n$ 1000) were added. The pressure was further reduced to 0.25 millimeter mercury and the temperature raised to 250° C. The polymerization continued for 40 minutes and ethylene glycol distilled from the reaction vessel. The polymer was then removed from the vessel and filaments formed by touching a glass rod to the molten polymer and pulling away. The filaments were drawn in a ratio of 4:1 at around 80° F. over a warm glass tube.

Polymer Characteristics

Color: Amber
Melting Point: 220° C.
Intrinsic Viscosity (60/40 Phenol/Tetrachloroethane): 0.634
Nitrogen: 0.43 Percent
Carboxylic Acid End Group (Equivalents/$10^6$ grams): 40
Dyeability: Excellent

EXAMPLE 3

The procedure is exactly as cited in Example 2 except t-butyl diethanolamine is added with bis($\beta$-hydroxyethyl) terephthalate. Succinic acid and poly(tetramethylene oxide) ($\overline{M}_n$ 1000) were added at a temperature of 240° C. and a pressure of 100 millimeters of mercury. The maximum polycondensation temperature in this case, however, was 260° C.

Polymer Characteristics

Color: Pale Yellow
Melting Point: 220° C.
Intrinsic Viscosity (60/40 Phenol/Tetrachloroethane): 0.740
Nitrogen: 0.44 Percent
Carboxylic Acid End Groups (Equivalents/$10^6$ grams): 41
Dyeability: Excellent

EXAMPLE 4

Dyeing of the hand drawn filaments was completed using either Acid Red 4 or Acid Blue 78 in a dye bath of pH2, which was acidified with hydrochloric acid. The dyebath was boiled for 60 to 90 minutes. The dyed fibers were not faded on 24 hours exposure to a carbon arc light in a Fade-Ometer.

The invention has been illustrated above particularly with respect to random copolyesters. The invention also includes ordered or block copolyesters of the units comprised in the random copolyesters. Embodiments of the invention illustrating block copolyesters are set out below.

Block copolyesters of this invention are segmented linear copolyesters comprised of randomly occurring first, (A), and second, (B), polyester segments connected through ester linkages. The (A) polyester segment is highly crystalline, melting above 200° C., and may be represented by the formula:

$$-(O-R-OCArC)_m$$
$$\phantom{-(O-R-O}\|\phantom{Ar}\|$$
$$\phantom{-(O-R-OCArC)_m}O\phantom{xx}O$$

wherein R = $C_2H_4$, $C_3H_6$, $C_4H_8$, or $-CH_2\text{–}\langle\bigcirc\rangle\text{–}CH_2-$ Ar = $\langle\bigcirc\rangle$ , $\langle\bigcirc\rangle$ or $\langle\bigcirc\bigcirc\rangle$ and $m=a$ number from 4 to about 200.

The second or (B) segment is a reaction product of an amine of this invention with aliphatic or aromatic dicarboxylic acids or mixtures thereof. Minor amounts of modifying dihydroxy compounds may be incorporated into this amine containing copolyester. Examples of such modifying agents are ethylene glycol, propylene glycol, tetramethylene glycol, neopentyl glycol, and glycol ethers, such as the Carbowaxes. This amine containing segment used generally has a molecular weight in the range of from about 700 to about 2000 as determined in chloroform or methanol by vapor phase osometry.

Preparation of typical block copolyesters of the invention is illustrated in the examples below.

EXAMPLE 5

Into a 5 liter flask equipped with a mechanically driven stirrer and a Dean-Starke moisture trap was placed three mols t-butyldiethanolamine and three mols glutaric acid with three liters of reagent grade toluene. The mixture was refluxed in a nitrogen atmosphere at least 20 hours. At this point about 105 milliliters water had separated in the moisture trap. The resulting homogeneous solution was treated with decolorizing charcoal, filtered and toluene evaporated on a rotary evaporator. Residual solvent was removed under high vacuum. The resulting polymer was a yellow viscous oil, number average molecular weight ($\overline{M}_n$) 1398 (chloroform, vapor pressure osometry).

EXAMPLE 6

This example substitutes succinic acid for glutaric acid. Thus 161 grams t-butyldiethanolamine and 118 grams succinic acid were reacted as in Example 5.

EXAMPLE 7

This example substitutes phenyldiethanolamine for t-butyldiethanolamine in Example 5. Thus 181 grams phenyl diethanolamine and 118 grams of succinic acid were reacted as in Example 6.

$$\left[O(CH_2)_x\overset{R}{N}(CH_2)_x - \overset{O}{\overset{\|}{O}C} - (CH_2)_y - \overset{O}{\overset{\|}{C}}\right]_n$$

poly(alkyldialkylene amine dicarboxylate)

EXAMPLE 8

Dimethyl terephthalate (3.68 lbs.) and ethylene glycol (2.48 lbs.) were reacted at 175° C. using 0.107 part per thousand zinc acetate as catalyst for 2.5 hours in a nitrogen atmosphere. The temperature was raised to 220° C. during which time 600 milliliters methanol had distilled into the receiver. After the addition of 0.21 part per thousand antimony trioxide catalyst, 193 grams (1.5 mol percent) of poly(t-butyl diethylene amine glutarate (number average molecular weight 1400, measured in chloroform) was added using a little ethylene glycol to assist in transfer and mixed under a nitrogen atmosphere for five minutes. Then vacuum was applied and temperature gradually increased until temperature was 265° C. and pressure less than 1.0 millimeter mercury (about ¾ hour). The reaction was completed under these conditions with ethylene glycol distilling from the vessel for 60 to 90 minutes.

Polymer Characteristics

Color: Pale Yellow
Melting Point: 232° C.
Intrinsic Viscosity (50/50 trifluoroacetic acid/methylene chloride): 0.62
Nitrogen: 0.44 Percent

EXAMPLE 9

As in Example 8, except a 2 mol percent level of poly(t-butyl diethylene amine glutarate) (number average molecular weight 1400, measured in chloroform) was added.

Characterization of Poly(Alkydialkylene Amine Dicarboxylate) Blocks

| Sample | Theory | Measure (Mn) | Elemental Analysis | | | Nuclear Magnetic Resonance (In Hertz, Hz, From Trimethyl Silane in Chloroform |
|---|---|---|---|---|---|---|
| | | | | Theory | Found | |
| Poly(t-butyldi-ethylene amine glutarate) (X=2, Y=3, n=3, with hydroxyl ends) | 932 | 958 | % C<br>% H<br>% N | 60.52<br>9.44<br>6.01 | 60.49<br>9.09<br>5.41 | 244 (triplet), 166 (triplet), 143 (triplet), 118 (multiplet), 64 (singlet) |
| Poly(t-butyldi-ethylene amine succinate) (X=Y=2, n=4) | 990 | 1009 | % C<br>% H<br>% N | 58.18<br>8.69<br>5.66 | 56.59<br>8.29<br>5.60 | 244 (triplet), 167 (triplet), 158 (singlet) 64 (singlet |
| Poly(phenyl di-ethylene amine succinate) (X=Y=2, n=5) | 1333 | 1341 | — | — | — | |

Polymer Characteristics

Color: Pale Yellow
Melting Point: 229° C.
Intrinsic Viscosity: 0.624
Nitrogen: 0.39 Percent

EXAMPLE 10

As in Example 8 except 1.1 mol percent poly(t-butyl diethylene amine glutarate) (number average molecular weight 1400, measured in chloroform) and 1 mol percent poly(tetramethylene oxide) (average molecular weight 1000) were added just prior to the vacuum cycle.

EXAMPLE 12

Dyeings were completed using 2 percent on weight of fiber (owf) Acid Red 4 or Acid Blue 78 at pH 3 or 4 adjusted with formic acid at the boil for 60 minutes. In cases of carrier use, 10 percent owf methyl naphthalene type was used. Temperatures of 120° C. under pressure could be substituted for carrier. The table below reviews the results for Examples 8, 9 and 10. Percentage dye uptake is based on reflectance measurements using nylon 6,6 dyed under identical conditions as 100 percent. Lightfastness was tested using a Fade-Ometer with a carbon arc light source for 20 and 40 hours. Ratings are given in the table based on a scale of 1 to 5 where 5 is no fading.

Dyeings of Block Copolyester Fibers

| Example | Dyeing Conditions | Color Value (%) (Nylon 6,6=100%) | Lightfastness 20 Hours | 40 Hours |
|---|---|---|---|---|
| 2% Acid Red 4 | | | | |
| 8 | pH 4.0 | 66 | 3-4 | 2 |
| 9 | 100° C. | 82 | 3-4 | 2 |
| 10 | No carrier | 82 | 3 | 2 |
| 8 | pH 4.0 | 90 | 4 | 2 |
| 9 | 100° C. | 95 | 4 | 2 |
| 10 | 10% owf carrier | 92 | 3-4 | 2 |
| 8 | pH 3.0 | 96 | 4-5 | 2-3 |
| 9 | 100° C. | 98 | 4-5 | 2-3 |
| 10 | 10% owf carrier | 96 | 4-5 | 2-3 |
| 8 | pH 4.0 | 79 | 4 | 2 |
| 9 | 120° C. | 90 | 4 | 2 |
| 10 | | 87 | 3 | 2 |
| 2% Acid Blue 78 | | | | |
| 8 | pH 4.0 | 67 | 3 | 1-2 |
| 9 | 120° C. | — | | |
| 10 | | 85 | 3 | 1-2 |
| 8 | pH 4.0 | 84 | | |
| 9 | 100° C. | 87 | | |
| 10 | 10% owf carrier | 81 | | |

Polymer Characteristics

Color: Pale Yellow
Melting Point: 234° C.
Intrinsic Viscosity: 0.672
Nitrogen: 0.31 Percent

EXAMPLE 11

The polymers were converted into yarn by extrusion from a one inch melt extruder at spin pack and pump temperatures of 510° F. and Godet take up speed of 800 meters per minute. The spun filaments were drawn in the ratio of 3.7:1 on commercial draw twisting equipment. The yarn prepared from Examples 8, 9 and 10 polymer preparations shows properties such as indicated in the table.

| Test | Example 8 | Example 9 | Example 10 |
|---|---|---|---|
| Denier | 130 | 128 | 127 |
| Intrinsic Viscosity | 0.501 | 0.501 | 0.549 |
| Carboxyl Ends (In Equivalents/ $10^6$ Grams) | 48 | 57 | 61 |
| Tensile (lbs.) | 0.62 | 0.53 | 0.66 |
| Tenacity (grams/denier) | 2.16 | 1.87 | 2.35 |
| Elongation (%) | 18.3 | 18.8 | 26.7 |
| Shrinkage (%) | 8.0 | 9.0 | 9.5 |
| Modulus (at 1% elongation) | 146 | 134 | 135 |

In preparing the block copolyesters the block containing the amine group will usually comprise three or more repeating units and will be used in an amount to provide from about 0.5 mol percent to about 15 mol percent of the final block copolyester amine based on the total mols of acid units present in the copolyester. Generally the block containing the amine group will contain from about 3 to 35 repeating units. Preferably the amount used will be sufficient to provide about 5 to 10 mol percent of amine based on the total mols of acid in the final copolyester.

The remainder of the block copolyester comprises blocks of a high melting polyester or copolyester of units of a glycol and units of an aromatic dicarboxylic acid. The glycol from which the unit is derived can be a polymethylene glycol, cycloalkylene glycol or other glycol that forms high melting polyester with aromatic dicarboxylic acids. Representative examples of glycols are ethylene glycol, propylene glycol, tetramethylene glycol and cyclohexane dimethanol. The acid from which the acid units is derived is an aromatic dicarboxylic acid. Representative examples are terephthalic acid, isophthalic acid, naphthalene dicarboxylic acid and mixtures of these acids as well as mixtures with up to 20 mol percent of another acid such as adipic acid, pimelic acid, sebacic acid and azelaic acid.

The block copolyesters of the invention are condensed to an intrinsic viscosity of at least 0.3 and generally at least 0.5. Copolyesters having an intrinsic viscosity of 0.6 provide fibers having good physical properties and stability.

In the practice of this invention the preparation of glycol esters is in general carried out in accordance with the usual known techniques. They may be suitably prepared by ester interchange, esterification or other method. The ester interchange is preferably carried out in the absence of oxygen, generally in an atmosphere of an inert gas such as nitrogen in order to lessen darkening and to make it possible to attain a high molecular weight pale or colorless polyester product from the glycol ester. Thus the ester interchange reaction is conducted at temperatures of 200° to 280° C. under a nitrogen atmosphere and atmospheric pressure. The subsequent condensation polymerization is carried out at 240° to 280° C. under reduced pressure of 0.01 to 0.5 millimeter of mercury pressure.

The amount of catalyst such as zinc acetate used may be varied over wide concentrations. As is usual with catalysts the amount will ordinarily be very small. As a general rule the amount will be within the range of from 0.001 to 0.100 weight percent based on the weight of the bis ester of dicarboxylic acid to give a satisfactory reaction rate and a product of suitable color.

The invention has been illustrated preparing the polymers with zinc acetate as catalyst. Other ester interchange catalysts can be used. Representative examples of such catalysts are litharge, sodium methylate, sodium borate, cadmium acetate, barium acetate and lanthanum acetate. Manganese catalyst seems to cause darkening of the polymer so it is preferred not to use a manganese catalyst.

The glycol esters can also be prepared by direct esterification of the glycol with the acid or other suitable material if desired. In the esterification it is preferred to react the glycol and the acid under elevated pressure in the presence of low molecular weight polyester.

The condensation step of preparing the polyesters has been illustrated using antimony trioxide as catalyst. Other condensation catalysts such as titanium glycolate, litharge, germanium, tungsten or columbium condensation catalysts can be used in place of the antimony trioxide illustrated. The amount of such catalyst used will generally be small. Amounts in the range of from about 0.001 to 0.1 weight percent based on the bis ester of dicarboxylic acid will be used.

The condensation reactions are in general carried out in accordance with usual known techniques. Thus the reactions are preferably carried out in the absence of oxygen, generally in an atmosphere of inert gas such as nitrogen or the like in order to lessen darkening. Condensation is carried out under reduced pressure, generally below 10 millimeters of mercury pressure and usually at or below one millimeter of mercury pressure at a temperature in the range of from about 260° to 280° C. The amount of such catalyst used will generally be small. Amounts in the range of from about 0.001 to 0.1 weight percent based on the bis ester of dicarboxylic acid will be used.

In testing for dyeabliliy of experimental samples the quantitative dyeabilities are compared with nylon 6,6 in terms of color value obtained by reflectance measurements. This measurement was related through the Kubelka-Munk equation, $F=(1-B)^2/2B$, where B is the reflectance and F a function of the reflectance. By setting the F value for nylon dyed under the same conditions as 100 percent, then values for example cited may be expressed relative to nylon on measuring their reflectance (see Table, Example 12).

Dyeings with anionic dyes such as Acid Red 4 and Acid Blue 78 were complete at pH 3-4, adjusted with formic acid and boiled 60 to 90 minutes with the aid of a carrier, such as methyl naphthalene or biphenyl type. Such dyeings gave very deep shades with superior washfastness and acceptable stability to light. Dyeings at temperatures above 100° C. under pressure could eliminate the need for the use of a carrier.

While certain representative embodiments and details have been shown for the purpose of illustrating the invention it will be apparent to those skilled in this art that various changes and modifications may be made therein without departing from the spirit or scope of the invention.

What I claim is:

1. The process which comprises incorporating anion attractive groups in linear thermoplastic fiber forming polyester resin by adding from about 1 to about 15 mol percent of a salt of (A) a hydroxyamine selected from the group consisting of monohydroxyamines and dihydroxyamines and (B) an organic dicarboxylic acid to a polyester forming reaction mixture, said salt being formed in situ in polyester forming reaction mixture, said mol percent being based on the mols of dicarboxylic acid in the polyester exclusive of the acid added with the amine, said reaction mixture comprising (1) a dicarboxylic acid or ester forming derivative of a dicarboxylic acid selected from the group consisting of terephthalic acid, isophthalic acid and naphthalic acid and saturated aliphatic dicarboxylic acids containing from 2 to 12 carbon atoms and (2) a glycol and reacting the mixture under condensation polymerization conditions to form modified linear thermoplastic fiber forming polyester resin that can be dyed to deep shades with acid type dyes, said resin having an intrinsic viscosity of at least 0.3 measured in a 60/40 phenol/tetrachloroethane mixed solvent.

2. The process of claim 1 in which the mol ratio of amine to dicarboxylic acid used to form the amine salt is 1:1 and the amine is added to the polyester forming reaction mixture in an amount to provide from about 1 to about 15 mol percent of amine units based on the total mols of acid units in the polyester reaction mixture exclusive of the acid units added in conjunction with the amine itself.

3. The process of claim 1 in which the resin being formed has the basic structure of fiber forming polyesters or copolyesters selected from the group consisting of polyalkylene terephthalate, polycycloalkylene terephthalate, polyalkylene naphthalate, polycycloalkylene naphthalate, polyalkylene terephthalate copolyesters containing at least 80 mol percent of polyalkylene terephthalate and polyalkylene naphthalate copolyesters containing at least 80 mol percent of polyalkylene naphthalate.

4. In the process of preparing a linear fiber forming polyester resin derived from dicarboxylic acids or ester forming derivatives thereof and glycols by condensation of glycol esters or low polymers thereof in improvement which comprises adding an organic dicarboxylic acid selected from the group consisting of aromatic dicarboxylic acids and aliphatic dicarboxylic acids to said glycol esters and then adding a hydroxyamine selected from the group consisting of monoalkanolamines of the general formula

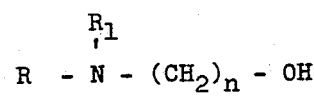

wherein $R_1$ is a radical selected from the group consisting of alkyl, cycloalkyl or aryl, $R_2$ is hydrogen or a radical selected from the group consisting of alkyl, cycloalkyl or aryl, and n is an integer having a value of from 2 to 10 and dihydroxyamines having the general formula

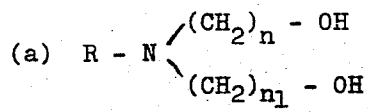

and

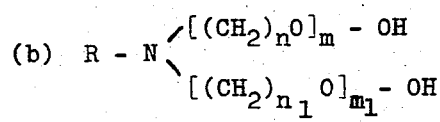

wherein R is a radical selected from the group consisting of alkyl, aryl, aralkyl, alkaryl, cycloalkyl, alkoxyalkyl, aryloxyalkyl, aralkoxy alkyl, alkoxy aryl, aryloxy aryl, alkaryloxy aryl, alkoxy aralkyl, aryloxy aralkyl, aralkoxy aralkyl and pyridyl radicals, n and $n_1$ are integers from 2 to 10 and m and $m_1$ are integers from 0 to 20 and wherein the R radicals can contain substituents such as alkyl ether, cycloalkyl ether and aryl ether groups such as ethoxy, propoxy, cyclohexoxy and phenoxy groups, said hydroxy amine to dicarboxylic acid is in the mol ratio of 1:1, and subjecting the mixture to condensation to form a high molecular weight polymer.

5. In the process of preparing a linear fiber forming polyester resin derived from dicarboxylic acids or ester forming derivatives thereof and glycols by condensation of glycol esters or low polymers thereof the improvement which comprises adding a hydroxyamine selected from the group consisting of monoalkanolamines of the general formula

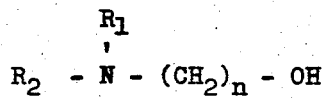

wherein $R_1$ is a radical selected from the group consisting of alkyl, cycloalkyl or aryl, $R_2$ is hydrogen or a radical selected from the group consisting of alkyl, cycloalkyl or aryl, and n is an integer having a value of from 2 to 10 and dihydroxyamines having the general formula

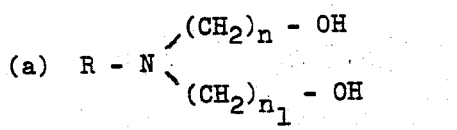

and

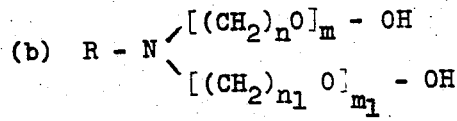

wherein R is a radical selected from the group consisting of alkyl, aryl, aralkyl, alkaryl, cycloalkyl, alkoxyalkyl, aryloxyalkyl, aralkoxyalkyl, alkoxy aryl, aryloxy aryl, alkaryloxy aryl, alkoxy aralkyl, aryloxy aralkyl, aralkoxy aralkyl and pyridyl radicals, n and $n_1$ are integers from 2 to 10 and m and $m_1$ are integers from 0 to 20, and the R radicals can obtain substituents such as alkyl ether, cycloalkyl ether and aryl ether groups such as ethoxy, propoxy, cyclohexoxy and phenoxy groups, said hydroxyamine to dicarboxylic acid is in the mol ratio of 1:1, and then adding an organic dicarboxylic acid selected from the group consisting of aromatic dicarboxylic acids and aliphatic dicarboxylic acids and subjecting the mixture to condensation to form a high molecular weight polymer.

6. The process of claim 5 in which the acid is at least one member selected from the group consisting of terephthalic acid, isophthalic acid, oxalic acid, malonic acid, succinic acid, glutaric acid, adipic acid, azelaic acid, pimelic acid, decanedioic acid and dodecane dioic acid.

7. The process of claim 5 in which the monohydroxyamine is selected from the group consisting of 2-cyclohexylamino-1-ethanol, 2(N-ethylanilino)-1-ethanol, N-ethyl-N-benzyl ethanolamine, 3-diethylamino-1-propanol, 3-diethylamino-2,2-dimethyl-1-propanol, 3-(2-pyridyl)-1-propanol, N-dibutyl glycolamine, 4-diethylamino-1-butanol, β-(diethylaminoethoxy) ethanol, 3-(3-pyridyl methylamino)-1-propanol, 2-[2-(p-tolyloxy)-ethylamino] ethanol, N-ethylethanolamine, N-ethyl-N-cyclohexyl-1-ethanolamine, N-ethyl-N-phenyl-1-ethanolamine, N-ethyl-N-tolyl-1-ethanolamine, N,N-dicyclohexyl-1-ethanolamine, N-cyclohexyl-N-phenyl-1-ethanolamine, N-cyclohexyl, N-tolyl-1-ethanolamine, N-cyclohexyl-N-benzyl-1-ethanolamine, N,N-diphenylamino-1-ethanol, N-phenyl-N-tolyl-1-ethanolamine, N-phenyl-N-benzyl-1-ethanolamine, N-phenyl-N-2-pyridyl-1-ethanolamine, N,N-ditolyl-1-ethanolamine, N-tolyl-N-2-pyridylamino-1-ethanol, N-benzyl-1-ethanolamine, N,N-dibenzylamino-1-ethanol, N-benzyl-N-2-pyridylamino-1-ethanol and N,N-di (2-pyridyl) amino-1-ethanol.

8. The process of claim 5 in which the dihydroxy amine is selected from the group consisting of substituted dialkanolamines such as the N-substituted diethanolamines, N-substituted dipropanolamines, N-substituted dibutanolamines and N-substituted dihexanolamines, N-substituted dipentanolamines, N-substituted dioctanolamines, N-substituted dinonanolamines and N-substituted didodecanolamines.

9. The process of claim 8 in which the dihydroxyamine is selected from the group consisting of N-methyl diethanolamine, N-ethyl diethanolamine, N-propyl diethanolamine, N-butyl diethanolamine, N-hexyl diethanolamine, N-heptyl diethanolamine, N-octyl diethanolamine, N-stearyl diethanolamine, N-phenyl diethanolamine, N-naphthyl diethanolamine, N-benzyl diethanolamine, N-phenethyl diethanolamine, N-tolyl diethanolamine, N-ethylphenyl diethanolamine, N-cyclohexyl diethanolamine, N-cyclododecyl diethanolamine, N-2-methoxyethyl diethanolamine, N-2-ethoxyethyl diethanolamine, N-2-phenoxyethyl diethanolamine, N-2-phenoxybutyl diethanolamine, N-2-benzyloxymethyl diethanolamine, N-2-benzyloxyethyl diethanolamine, N-p-ethoxybenzyl diethanolamine, oxybenzyl diethanolamine and N-benzyloxyphenyl diethanolamine.

10. The process of claim 1 in which the polyester being modified is selected from the group consisting of polyethylene terephthalate, polycyclohexylene dimethylene terephthalate, polyethylene naphthalate, polycyclohexylene dimethylene naphthalate, ethylene terephthalate copolyesters containing at least 80 mol percent of ethylene terephthalate, ethylene terephthalate-ethylene aliphatic dicarboxylate copolyesters containing at least 80 mol percent of ethylene terephthalate and ethylene naphthalate-ethylene aliphatic dicarboxylate copolyesters containing at least 80 mol percent of ethylene naphthalate.

11. The process of claim 1 wherein the linear thermoplastic fiber forming resins are derived from (1) aromatic dicarboxylic acid selected from the group consisting of terephthalic acid, isophthalic acid and the naphthalic acids and aliphatic dicarboxylic acids selected from the group consisting of adipic acid, sebacic acid, azelaic acid and (2) glycols selected from the group consisting of ethylene glycol, the propylene glycols, tetramethylene glycol, pentamethylene glycol and 1,4 cyclohexane dimethanol.

* * * * *